(12) United States Patent
Sengupta et al.

(10) Patent No.: US 8,885,440 B2
(45) Date of Patent: Nov. 11, 2014

(54) CONSTRUCTING VELOCITY MODELS NEAR SALT BODIES

(76) Inventors: Madhumita Sengupta, Houston, TX (US); Ran Bachrach, Houston, TX (US)

(*) Notice: Subject to any disclaimer, the term of this patent is extended or adjusted under 35 U.S.C. 154(b) by 1287 days.

(21) Appl. No.: 12/419,567

(22) Filed: Apr. 7, 2009

(65) Prior Publication Data

US 2009/0234622 A1 Sep. 17, 2009

Related U.S. Application Data

(63) Continuation-in-part of application No. 11/969,162, filed on Jan. 3, 2008.

(60) Provisional application No. 61/043,076, filed on Apr. 7, 2008, provisional application No. 60/883,646, filed on Jan. 5, 2007.

(51) Int. Cl.
*G01V 1/00* (2006.01)
*G01V 1/30* (2006.01)
*G01V 1/28* (2006.01)

(52) U.S. Cl.
CPC .............. *G01V 1/303* (2013.01); *G01V 1/282* (2013.01); *G01V 1/306* (2013.01)
USPC .......................................................... 367/73

(58) Field of Classification Search
CPC ....... G01V 1/282; G01V 1/303; G01V 1/306; G01V 1/307
USPC ........................................ 367/73; 702/11, 18
See application file for complete search history.

(56) References Cited

U.S. PATENT DOCUMENTS

| 5,691,475 A | 11/1997 | Marsala et al. |
| 6,128,577 A * | 10/2000 | Assa et al. ................... 702/2 |

(Continued)

FOREIGN PATENT DOCUMENTS

| GB | 2422031 A | 7/2006 |
| WO | 03052459 A1 | 6/2003 |

OTHER PUBLICATIONS

International Search Report and Written Opinion of PCT Application No. PCT/US2008/050225 dated Jun. 4, 2008.

(Continued)

*Primary Examiner* — Krystine Breier

(57) ABSTRACT

A method and apparatus for constructing a velocity model of a subsurface of the earth, is disclosed herein. Seismic data may be received. A first velocity model of the subsurface may be constructed using the seismic data. The subsurface may have one or more salt bodies. A second velocity model of the subsurface without the salt bodies may be constructed using the seismic data. A set of attributes induced by the salt bodies may be determined based on the first velocity model and the second velocity model. A stiffness tensor change between the first velocity model and the second velocity model may be calculated based on the set of attributes induced by the salt bodies. The first velocity model may be updated based on the stiffness tensor change.

20 Claims, 3 Drawing Sheets

(56) References Cited

U.S. PATENT DOCUMENTS

| | | |
|---|---|---|
| 6,502,037 B1 | 12/2002 | Jorgensen et al. |
| 6,714,873 B2 | 3/2004 | Bakulin et al. |
| 7,277,795 B2 | 10/2007 | Boitnott |
| 7,299,132 B2 | 11/2007 | Sayers et al. |
| 7,355,923 B2 | 4/2008 | Reshef et al. |
| 7,400,552 B2 | 7/2008 | Moldoveanu et al. |
| 7,526,385 B2 | 4/2009 | Sayers |
| 7,586,811 B2 * | 9/2009 | Banik ............ 367/73 |
| 7,755,972 B2 | 7/2010 | Yogeswaren et al. |
| 7,830,747 B2 | 11/2010 | Söllner |
| 7,859,943 B2 | 12/2010 | Herwanger |
| 8,098,543 B2 | 1/2012 | Bachrach et al. |
| 2005/0065730 A1 | 3/2005 | Sinha |
| 2005/0171698 A1 | 8/2005 | Sung et al. |
| 2006/0153005 A1 | 7/2006 | Herwanger et al. |
| 2007/0259432 A1 * | 11/2007 | Zhao et al. ............ 436/25 |
| 2008/0165619 A1 * | 7/2008 | Bachrach et al. .......... 367/38 |
| 2010/0018718 A1 | 1/2010 | Krebs et al. |

OTHER PUBLICATIONS

Examination Report of European Application Serial No. 08713536.4 dated Sep. 2, 2011.

Detournay et al., "Fundamentals of Poroelasticity," Chapter 5 in Comprehensive Rock Engineering: Principles, Practice and Projects, Analysis and Design Method, Ed. C. Fairhurst: Pergamon Press, 1993: pp. 1-95.

Prioul et al., "Nonlinear rock physics model for estimation of 3D subsurface stress in anisotropic formations: Theory and laboratory verification," Geophysics, Mar.-Apr. 2004, vol. 69(2): pp. 415-425.

Tsvankin, "Anisotropic parameters and P-wave velocity for orthohombic media," Geophysics, Jul.-Aug. 1997, vol. 62(4): pp. 1292-1309.

Kachanov, "A Microcrack Model of Rock Inelasticity Part 1: Frictional Sliding on Microcracks," Mechanics of Materials, 1982, vol. 1: pp. 19-27.

* cited by examiner

CONSTRUCTING VELOCITY MODELS NEAR SALT BODIES

CROSS-REFERENCE TO RELATED APPLICATIONS

This application claims benefit of U.S. provisional patent application Ser. No. 61/043,076, filed Apr. 7, 2008. This application is also a continuation-in-part of co-pending U.S. patent application Ser. No. 11/969,162, filed Jan. 3, 2008, which claims benefit of U.S. provisional patent application Ser. No. 60/883,646, filed Jan. 5, 2007. Each of the aforementioned related patent applications is herein incorporated by reference.

BACKGROUND

1. Field of the Invention

Implementations of various technologies described herein generally relate to the field of geology and geophysics and more particularly, to the estimation of characteristics of formations containing salt bodies.

2. Description of the Related Art

The following descriptions and examples do not constitute an admission as prior art by virtue of their inclusion within this section.

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometime also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate the presence or absence of probable locations of hydrocarbon deposits.

Many subsurface-related human activities, such as oil and gas exploration and production, mining, underground construction, and earthquake prediction, can benefit from direct estimates of the state of stress of the earth subsurface. The importance of stress estimates increases when principal stresses are not equal to each other and when some preferred directions, e.g., directions of maximum and minimum stresses, exist in geological media.

Examples of applications requiring good knowledge of existing stressed state or pore fluid pressure include planning of drilling operation and mine construction. In those situations, poor estimates of effective stresses may lead to additional costs and safety problems related to geological hazards and instability of borehole or mine. Furthermore, the development of many existing oil fields and orientation of fractures are typically controlled by direction of maximum horizontal stress. Therefore, stress characterization performed prior to production may reduce risk in reservoir management decisions, particularly for production in areas having salt bodies.

SUMMARY

Described herein are implementations of various technologies for constructing velocity models near salt bodies. In one implementation, seismic data may be received. A first velocity model of the subsurface may be constructed using the seismic data. The subsurface may have one or more salt bodies. A second velocity model of the subsurface without the salt bodies may be constructed using the seismic data. A set of attributes induced by the salt bodies may be determined based on the first velocity model and the second velocity model.

In one implementation, a set of attributes of the second velocity model may be subtracted from a set of attributes of the first velocity model. The result of the subtraction may generate the set of attributes induced by the salt bodies. A stiffness tensor change between the first velocity model and the second velocity model may be calculated based on the set of attributes induced by the salt bodies. The first velocity model may be updated based on the stiffness tensor change.

In another implementation, a set of salt-induced stresses and salt-induced strains may be determined based on the first velocity model and the second velocity model. The stiffness tensor change may be calculated based on the set of salt-induced stresses and salt-induced strains. Further, the updated velocity model may be calibrated to the seismic data. The stiffness tensor change between the calibrated first velocity model and the second velocity model may then be calculated based on the set of salt-induced stresses and salt-induced strains.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a method for constructing velocity models in a formation near salt bodies.

In one implementation, a first velocity model of a subsurface having one or more salt bodies may be constructed using seismic data. A second velocity model of the same subsurface may be constructed using the seismic data, however, without the salt bodies. The stresses and strains of the two velocity models may be calculated. The stresses and strains induced by the salt bodies may then be calculated by subtracting the stresses and strains of the second velocity model from the stresses and strains of the first velocity model.

The velocities and anisotropy parameters of the first velocity model may then be updated by calculating a stiffness tensor change and calibrating the first velocity model to the seismic data. The stiffness tensor change may be calculated using the first velocity model, the stresses and strains induced by the salt bodies and the third order elasticity theory. The third order elasticity theory predicts updates to the velocity model and anisotropic parameters from the differential strains between the first velocity model and the second velocity model.

The velocities and anisotropy parameters of the first velocity model may be updated based on the stiffness tensor change. In turn, the updated velocities and anisotropy parameters may be calibrated to available seismic data. The stiffness tensor change may then be re-calculated using the calibrated velocities and anisotropy parameters. The updated first velocity model may then be re-updated as described above, but using the re-calculated stiffness tensor change.

One or more implementations of various techniques for constructing velocity models in a formation near salt bodies will now be described in more detail with reference to FIGS. 1-3 in the following paragraphs.

Figure 1:
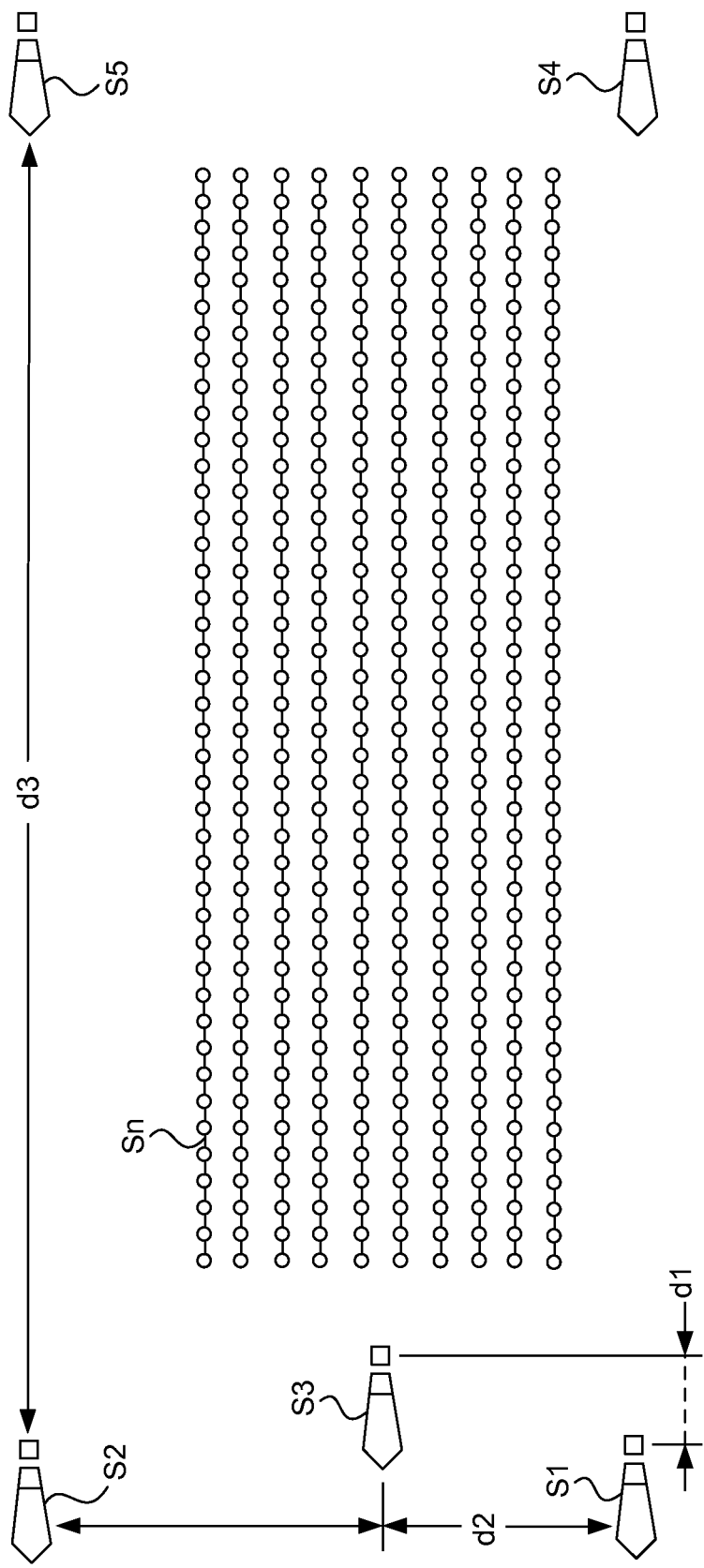
FIG. 1 is a plan or overhead schematic illustrating location of vessels and devices for acquiring seismic data in accordance with implementations described herein.

FIG. 1 is a plan or overhead schematic illustrating location of vessels and devices for acquiring seismic data in accordance with implementations described herein. The implementation represented schematically in FIG. 1 allows split-spread seismic data about a subsurface to be acquired simultaneously on two seismic sources lines. One benefit of acquiring two source lines simultaneously is a reduction in the acquisition time by half. In one implementation, the use of a greater number of source lines) may produce a greater time savings.

Source-only vessels S1 and S2 travel to the left in the schematic, as does source-streamer vessel S3, and source-only vessels S4 and S5. Source-only vessels S1 and S2 tow sources to the front-port and front-starboard, respectively, while source-only vessels S4 and S5 tow sources to the back-port and back-starboard, respectively. Source-only vessels S1 and S4 travel approximately the same port line, while source-only vessels S2 and S5 travel approximately the same starboard line.

Source-streamer vessel S3 tows a source as well as 10 streamer cables, designated as Sn. The number of streamer cables may vary as desired depending on the data to be gathered. Anywhere from 1 to 20 streamers are typical. The streamers towed by source-streamer vessel S3 may be equal in length and at the same depth. In one implementation, streamers Sn may be about 7000 meters in length.

The sources towed by source-only vessels S1 and S2 are separated in the y-coordinate direction. The y-coordinate direction is approximately perpendicular to the direction of travel of the spread, from the source towed by source-streamer vessel S3 by distances as indicated by arrow d2.

The cross-line distances S1-S2 and S1-S3 may be the same or different. In this implementation, d2 is about 1500 meters port for S1, and about 1500 meters starboard for S2. Arrow d1 indicates a distance in the X-coordinate, or in-line direction of travel, between S1 and S3, as well as between S2 and S3, although these distances may be the same or different. In this example, d1 is about 500 meters. Finally, d3 represents the distance in the X-coordinate between sources towed by source-only tow vessels S2 and S5, as well as between the sources towed by source-only tow vessels S1 and S3. However, it is to be noted that the distances S1-S4 and S2-S5 may be the same or different. In one implementation, distance d3 is about 9000 meters.

In operation, as vessels S1, S2, S3, S4, and S5 travel forward, i.e., to the left in FIG. 1, the sources may be fired either sequentially or in some other manner, and receivers in streamers Sn may collect data. Since there are two source signaling lines (line S1-S4 and line S2-S5), as well as signals from S3, the sub-sea geologic formations between lines S1-S4 and S2-S5 may be collected without the need for the spread to traverse the same path twice.

Various implementations are described herein with reference to wide azimuth or full azimuth marine seismic data acquired according to various techniques described in commonly assigned U.S. patent application Ser. No. 11/335,365, entitled METHODS AND SYSTEMS FOR EFFICIENTLY ACQUIRING WIDE AZIMUTH AND/OR FULL AZIMUTH TOWED STREAMER SEISMIC SURVEYS. The wide azimuth and/or full azimuth seismic data may be referred to herein as seismic data.

In one implementation, the seismic data may be used to improve traditional estimates of velocity and anisotropy near salt bodies or other complex structures. The development of an existing oil field and orientation of fractures are typically controlled by direction of maximum horizontal stress. Therefore, stress characterization performed prior to production may reduce risk in reservoir management decisions, particularly for production in areas having salt bodies. The estimation of velocities and anisotropy parameters is described in greater detail with reference to FIG. 2.

Advantageously, improved velocity and anisotropic modeling may be used: (1) to improve seismic imaging (e.g., by constraining velocity and anisotropy for subsequent iterations of tomography), (2) for reservoir characterization and management, and (3) for drilling hazard identification. Anyone of these applications may be used to improve hydrocarbon identification and/or production.

Figure 2:
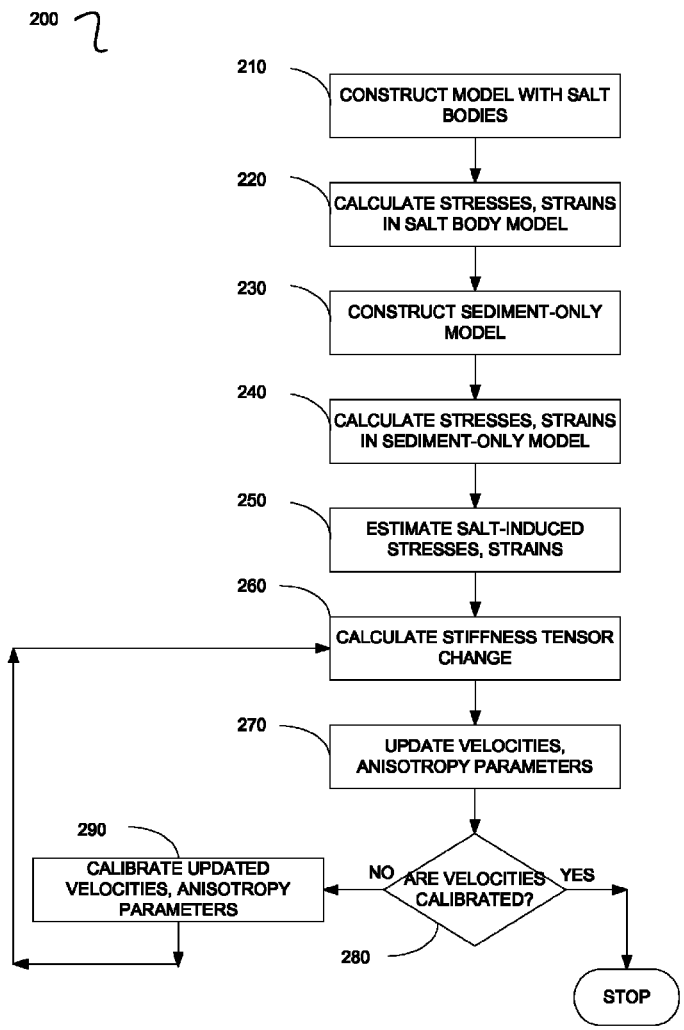
FIG. 2 is a flowchart illustrating a method of constructing a velocity model of a subsurface containing salt bodies in accordance with implementations described herein.

FIG. 2 illustrates a flow chart of a method 200 for constructing a velocity model of a subsurface containing salt bodies in accordance with implementations described herein. It should be understood that while the flow chart indicates a particular order of execution of the operations, in some implementations, certain steps of method 200 may be executed in a different order.

At step 210, a velocity model of the subsurface containing one or more salt bodies may be constructed using the seismic data. The velocity model may also be referred to herein as a geomechanical earth model, which may be defined as a combination of 3D seismic image and a set of physical properties assigned to each pixel in the 3D seismic image. In one implementation, the geomechanical model may be constructed using vintage seismic images to map salt bodies, and migration velocity analysis constrained by well log data.

Vintage seismic images refer to any seismic image of the same area, shot with a relatively older technology. For example, vintage seismic images may include single azimuth seismic images (as opposed to new wide-azimuth data), or conventional seismic images (as opposed to Q data). Vintage seismic images may also refer to old 2D lines, as opposed to new 3D data. The well log data may be interpolated in 3D using seismic horizons, which may be defined as visible layers in the 3D seismic image.

At step 220, the stresses and strains in the salt body model may be calculated. In one implementation, a numerical solver may be applied to the salt body model to solve for stress and strain associated with the salt body model. The numerical solver may include finite element equations, finite difference equations and the like. In one implementation, the numerical solver may be configured to solve a static elastic, visco-elastic, poro-elastic, or elastic-plastic model. In this manner, a three dimensional map of the stresses and strains associated with the salt body model may be derived.

In the case of a static elastic model, the strains may be determined using equilibrium equations, given by $$\frac{\partial \sigma_{11}}{\partial x_1} + \frac{\partial \sigma_{21}}{\partial x_2} + \frac{\partial \sigma_{31}}{\partial x_3} = f_1$$

$$\frac{\partial \sigma_{12}}{\partial x_1} + \frac{\partial \sigma_{22}}{\partial x_2} + \frac{\partial \sigma_{32}}{\partial x_3} = f_2 \quad \text{EQUATION 1}$$

$$\frac{\partial \sigma_{13}}{\partial x_1} + \frac{\partial \sigma_{23}}{\partial x_2} + \frac{\partial \sigma_{33}}{\partial x_3} = f_3$$

where $f_i$ are the body forces, and $\sigma_{ij}$ are the strains.

The constitutive relation is given by the generalized Hooke's law:

$$\sigma_{ij} = \sum_{kl} C_{ijkl}\varepsilon_{kl} \quad \text{EQUATION 2}$$

where $C_{ijkl}$ is the stiffness tensor. In the case of visco-elastic modeling, the Constitutive 3-D visco-elastic law is written in the frequency domain when the stiffness tensor is complex $C^*_{ijkl}$.

The stress tensor may be decomposed into deviatoric stress, $S_{ij}$ and mean stress such that $\sigma_M = \sigma_{kk}/3$. Similarly, the strain tensor may be decomposed into mean and deviatoric strains such that $\epsilon_{ij} = e_{ij} - \delta_{ij}\epsilon_{kk}/3$. For a visco-elastic material, the stress strain relation is given by:

$$\sigma_{kk} = 3K\varepsilon_{kk}$$

$$\left[\frac{1}{G}\partial_t + \frac{1}{\eta}\right]S_{ij} = [\partial_t]e_{ij} \quad \text{EQUATION 3}$$

or $$S_{ij} = \int_0^t Ge^{(t-t')/\tau}\partial_{t'} e_{ij}\,dt'$$

if a Maxwell element is used to represent a visco-elastic salt. Note that the integral representation of the deviatoric stress is using Maxwell element creep function.

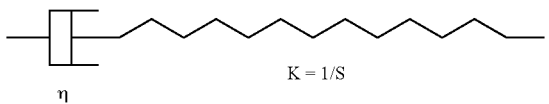 [SMILES: CCCCCCCCCCCCCCC1C(C)CC(C)CC1C]

Maxwell Element

The field equation for 3-D visco-elastic solid is represented as follows:

$$\nabla \cdot \sigma = F \rightarrow \nabla \cdot (S_{ij} - \delta_{ij}\sigma M) = F \quad \text{EQUATION 4}$$

Equation 3 shows Navier's equation (equilibrium of stress and body forces) and a visco-elastic Maxwell element as a constitutive equation. Note that if the viscosity is infinite everywhere, the visco-elastic approach becomes identical to the elastic approach. The visco-elastic behavior of salt may be approximated with an elastic constitutive law, if we assign a very high Poisson's ratio (>0.49) to the salt body.

At step 230, a geomechanical earth model of the subsurface without the salt bodies may be constructed. This model is referred to herein as a sediment-only model. The velocity of the sediment-only model may be obtained from tomography, either before salt flood, or from compaction trends. At step 240, the stresses and strains in the sediment-only model may be calculated, using finite element equations, finite difference equations or the like.

The result of the finite element equations using the elastic constitutive model shows a significant effect of the salt geometry on the stresses and strains in the 3-D model. The salt itself has zero shear stresses inside it, but near the edges of the salt body, high deviatoric stresses, and large stress anisotropy are typically observed, especially near the areas showing significant topography. Similar results may be obtained using the visco-elastic model where the salt is modeled as a visco-elastic material.

At step 250, the salt-induced stresses and strains may be estimated. The estimation may be determined by subtracting the stresses and strains in the sediment-only model from the stresses and strains in the salt-body model.

At step 260, a change in stiffness tensor resulting from the salt-induced strains may be calculated. In one implementation, the stiffness tensor change may be calculated using third order elasticity theory.

Non-linear elasticity theory (Thruston, 1974) provides relationships between effective stiffness tensor $C_{ijkl}$ and principal strains Emn:

$$C_{ijkl} = A_{ijkl} + A_{ijklmn}E_{mn} \quad \text{EQUATION 5}$$

where $A_{ijkl}$ is the unstressed fourth-order stiffness tensor and can be represented as a second-order matrix $c_{ij0}$ in Voigt notation.

The third-order elasticity theory may be used to compute the change in stiffness from the modeled change in strain due to the presence of the salt body, given by the equations:

$$c_{11} \approx c_{11}^0 + c_{111}E_{11} + c_{112}(E_{22} + E_{33})$$

$$c_{22} \approx c_{11}^0 + c_{111}E_{22} + c_{112}(E_{22} + E_{33})$$

$$c_{33} \approx c_{33}^0 + c_{111}E_{33} + c_{112}(E_{11} + E_{22})$$

$$c_{12} \approx c_{12}^0 + c_{112}(E_{11} + E_{33}) + c_{123}E_{22}$$

$$c_{13} \approx c_{13}^0 + c_{112}(E_{11} + E_{33}) + c_{123}E_{22}$$

$$c_{23} \approx c_{13}^0 + c_{112}(E_{22} + E_{33}) + c_{123}E_{11}$$

$$c_{66} \approx c_{66}^0 + c_{144}E_{33} + c_{155}(E_{11} + E_{22})$$

$$c_{55} \approx c_{55}^0 + c_{144}E_{22} + c_{155}(E_{11} + E_{33})$$

$$c_{44} \approx c_{44}^0 + c_{144}E_{11} + c_{155}(E_{22} + E_{33}) \quad \text{EQUATION 6}$$

where $c_{ijk}$ are the third-order elasticity (TOE) coefficients. TOE coefficients may be obtained from laboratory measurements, estimated from Sonic Scanner measurements in well logs, or estimated from conventional well log data. The TOE coefficients may be locally calibrated to give reliable values of velocity and anisotropy that can be used in a quantitative manner.

Poroelasticity refers to constitutive relations in a two-phase system with a porous matrix (rock frame) and a pore-fluid that resides inside the pores of the rock frame. The constitutive relations of poroelasticity are described in greater detail in "Fundamentals of Poroelasticity," Chapter 5 in Comprehensive Rock Engineering: Principles, Practice and Projects, Vol. II, Analysis and Design Method, Detournay, E. and Cheng, A. H.-D., ed. C. Fairhurst, Pergamon Press, pp. 8-9 (1993).

Plastic deformation refers to irreversible deformation, i.e., when the strain/deformation is not recoverable upon reverting to the original stress state. One model for plastic deformation is described in greater detail in, "A Microcrack Model of Rock Inelasticity," Mechanics of Materials, Vol. 1, Kachanov, pp. 19-27 (1982).

At step 270, the change in the stiffness tensor may be used to update the velocity field in the salt-body model. The computation of the updated velocity field may include computation of anisotropy parameters because the velocity field is anisotropic in nature. The presence of complex salt structures may lead to large deviatoric stresses and strains near the edges of the salt body. Third-order elasticity theory predicts that large deviatoric stresses result in velocity anisotropy near the edges of the salt body.

The presence of salt may also lead to large density contrasts in the subsurface, as the salt is substantially lighter than the sediments around it. The density contrast causes large buoyant forces, which reduces the effective stress below the salt, resulting in significant velocity reduction below salt bodies.

At step 280, a determination is made as to whether the velocities and associated anisotropic parameters are calibrated. If so, method 200 stops. If the velocities are not calibrated, the flow continues to step 290.

At step 290, the velocities and anisotropic parameters may be calibrated to available data, such as well data or wide-azimuth seismic data. The calibrated velocities and anisotropic parameters may then be used to update the salt-body model. As such, the flow then returns to step 260, using the updated salt-body model.

In one implementation, measurements of velocity and anisotropy parameters from a subsalt well may be used to calibrate the TOE coefficients, and the calibrated TOE coefficients may then be used to re-update the salt-body model.

The TOE coefficients may be estimated by using an observation of local anisotropy. The stress modeling results together with the local anisotropy observations may be used to determine the TOE coefficients FIG. 3 illustrates a computer network 300, into which embodiments of the invention may be implemented. The computer network 300 includes a system computer 330, which may be implemented as any conventional personal computer or workstation, such as a UNIX-based workstation. The system computer 330 is in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one embodiment, seismic data from hydrophones are stored in disk storage device 331. The system computer 330 may retrieve the appropriate data from the disk storage device 331 to perform the estimation of velocities and anisotropy parameters according to program instructions that correspond to the methods described herein. The program instructions may be written in a computer programming language, such as C++, Java and the like. The program instructions may be stored in a computer-readable memory, such as program disk storage device 333. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 330 presents output primarily onto graphics display 327, or alternatively via printer 328. As an example, the system computer may display updated velocity model on the graphics display 327. The system computer 330 may store the results of the methods described above on disk storage 329, for later use and further analysis. The keyboard 326 and the pointing device (e.g., a mouse, trackball, or the like) 325 may be provided with the system computer 330 to enable interactive operation.

The system computer 330 may be located at a data center remote from the survey region. The system computer 330 is in communication with hydrophones (either directly or via a recording unit, not shown), to receive signals indicative of the reflected seismic energy. These signals, after conventional formatting and other initial processing, are stored by the system computer 330 as digital data in the disk storage 331 for subsequent retrieval and processing in the manner described above.

Figure 3:
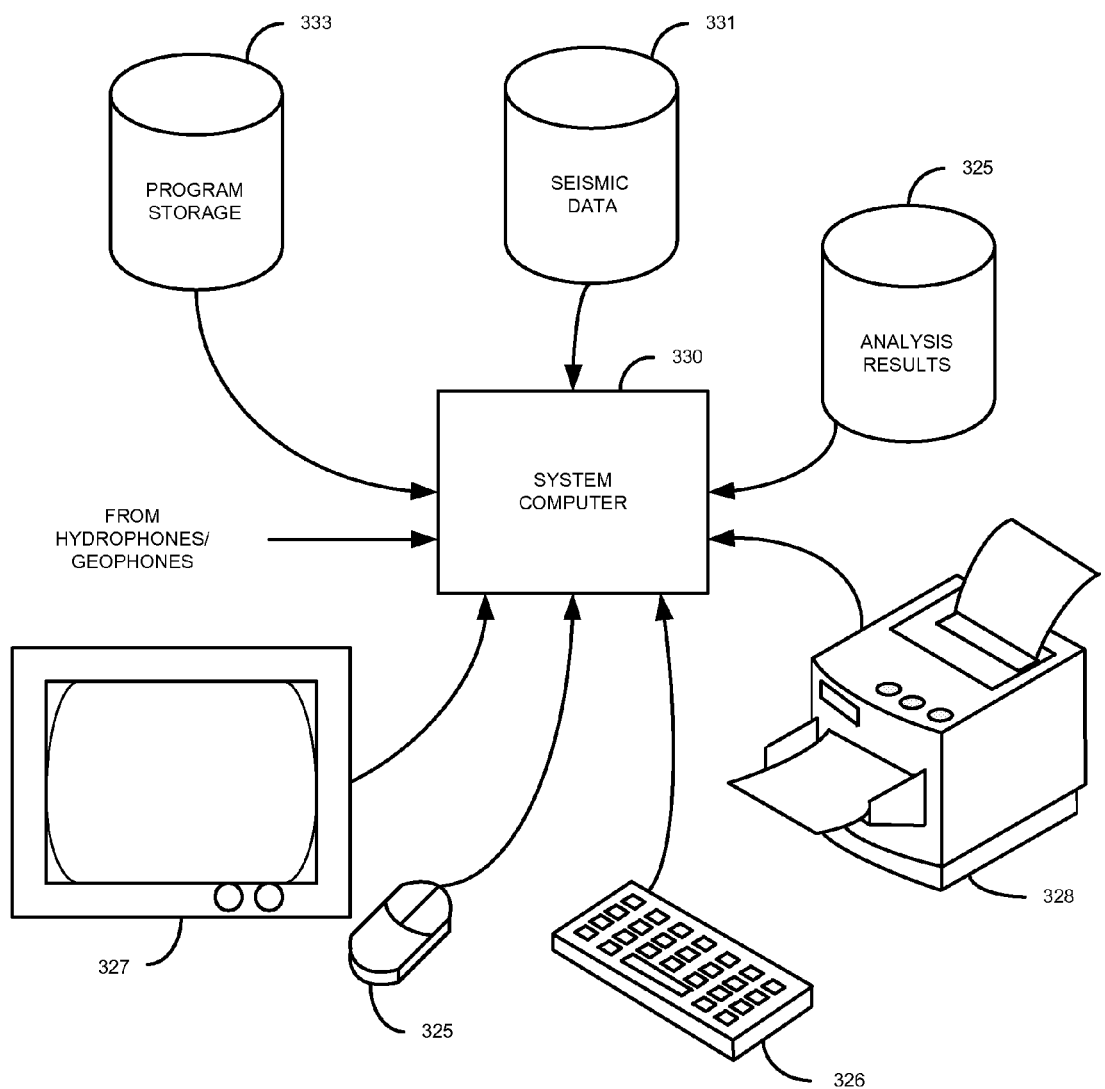
FIG. 3 illustrates a computer network, into which embodiments of the invention may be implemented.

While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for constructing a velocity model of a subsurface of the earth, comprising:
   receiving seismic data acquired by one or more receivers;
   constructing a first velocity model of the subsurface having one or more salt bodies using the seismic data;
   constructing a second velocity model of the subsurface without the salt bodies using the seismic data and tomography;
   determining a set of attributes induced by the salt bodies based on the first velocity model and the second velocity model;
   calculating a stiffness tensor change between the first velocity model and the second velocity model, based on the set of attributes induced by the salt bodies; and
   updating the first velocity model based on the stiffness tensor change.

2. The method of claim 1, wherein determining the set of attributes induced by the salt bodies comprises:
   calculating a first set of attributes of the first velocity model;
   calculating a second set of attributes of the second velocity model; and
   subtracting the second set of attributes from the first set of attributes.

3. The method of claim 2, wherein the first set of attributes comprises a first set of stresses of the first velocity model and a first set of strains of the first velocity model, the second set of attributes comprises a second set of stresses of the second velocity model and a second set of strains of the second velocity model, and the set of attributes comprises a set of salt-induced stresses and a set of salt-induced strains.

4. The method of claim 2, wherein the first set of attributes is determined using a numerical solver configured to solve one of the following:
a static elastic model of the first velocity model;
a visco-elastic model of the first velocity model;
a poro-elastic model of the first velocity model; and
an elastic-plastic model of the first velocity model.

5. The method of claim 2, wherein the second set of attributes is determined using a finite element solver.

6. The method of claim 1, further comprising:
determining whether the updated first velocity model is calibrated to the seismic data;
if not, calibrating the first velocity model to the seismic data;
calculating the stiffness tensor change between the calibrated first velocity model and the second velocity model, based on the set of attributes; and
updating the calibrated first velocity model based on the stiffness tensor change.

7. The method of claim 1, wherein the stiffness tensor change is calculated using a third order elasticity theory.

8. The method of claim 1, wherein the seismic data comprises one of:
wide-azimuth seismic data;
full-azimuth seismic data;
vintage seismic images;
vertical seismic profile data; or
combinations thereof.

9. A computer-readable storage medium, comprising program instructions executable by a computer processor to:
receive seismic data;
construct a first velocity model of a subsurface having one or more salt bodies using the seismic data;
construct a second velocity model of the subsurface without the salt bodies using the seismic data and tomography;
determine a set of salt-induced stresses and salt-induced strains induced by the salt bodies based on the first velocity model and the second velocity model;
calculate a stiffness tensor change between the first velocity model and the second velocity model, based on the set of salt-induced stresses and salt-induced strains;
update the first velocity model based on the stiffness tensor change;
determine whether the updated first velocity model is calibrated to the seismic data;
if not, calibrate the first velocity model to the seismic data;
calculate the stiffness tensor change between the calibrated first velocity model and the second velocity model, based on the set of salt-induced stresses and salt-induced strains; and
update the calibrated first velocity model based on the stiffness tensor change.

10. The computer-readable storage medium of claim 9, wherein the set of salt-induced stresses and salt-induced strains are determined by:
calculating a first set of attributes of the first velocity model;
calculating a second set of attributes of the second velocity model; and
subtracting the second set of attributes from the first set of attributes.

11. The computer-readable storage medium of claim 10, wherein the first set of attributes is determined using a numerical solver configured to solve one of the following:
a static elastic model of the first velocity model;
a visco-elastic model of the first velocity model;
a poro-elastic model of the first velocity model; and
an elastic-plastic model of the first velocity model.

12. The computer-readable storage medium of claim 10, wherein the second set of attributes is determined using a finite element solver.

13. The computer-readable storage medium of claim 10, wherein the first set of attributes comprises a first set of stresses and a first set of strains, and the second set of attributes comprises a second set of stresses and a second set of strains.

14. The computer-readable storage medium of claim 13, wherein the second set of stresses and the second set of strains are determined using a finite element solver.

15. The computer-readable storage medium of claim 9, wherein the stiffness tensor change is calculated using a third order elasticity theory.

16. The computer-readable storage medium of claim 9, further comprising program instructions executable by a computer processor to improve seismic imaging using the updated first velocity model.

17. A computer system, comprising:
a computer processor; and
a memory comprising program instructions executable by the computer processor to:
(a) receive seismic data;
(b) construct a first velocity model of a subsurface having one or more salt bodies using the seismic data;
(c) construct a second velocity model of the subsurface without the salt bodies using the seismic data and tomography;
(d) calculate a first set of attributes of the first velocity model;
(e) calculate a second set of attributes of the second velocity model; and
(f) subtract the second set of attributes from the first set of attributes to generate a third set of attributes induced by the salt bodies;
(g) calculate a stiffness tensor change between the first velocity model and the second velocity model, based on the third set of attributes; and
(h) update the first velocity model based on the stiffness tensor change;
(i) determine whether the updated first velocity model is calibrated using the seismic data;
(j) if not, calibrate the first velocity model to the seismic data; and
(k) repeat steps (g) and (h).

18. The system of claim 17, wherein the first set of attributes comprises a first set of stresses and a first set of strains, the second set of attributes comprises a second set of stresses and a second set of strains, and the third set of attributes comprises a set of salt-induced stresses and a set of salt-induced strains.

19. The system of claim 17, wherein the first set of attributes is determined using a numerical solver configured to solve one of the following:
a static elastic model of the first velocity model;
a visco-elastic model of the first velocity model;
a poro-elastic model of the first velocity model; and
an elastic-plastic model of the first velocity model.

20. The system of claim 17, wherein the second set of attributes is determined using a finite element solver.

* * * * *